United States Patent
Feuerstein

[19]

[11] Patent Number: 6,070,090
[45] Date of Patent: May 30, 2000

[54] INPUT SPECIFIC INDEPENDENT SECTOR MAPPING

[75] Inventor: Martin J. Feuerstein, Redmond, Wash.

[73] Assignee: Metawave Communications Corporation, Redmond, Wash.

[21] Appl. No.: 08/970,121

[22] Filed: Nov. 13, 1997

[51] Int. Cl.[7] .................................................. H04B 1/38
[52] U.S. Cl. ........................... 455/561; 455/562; 455/560
[58] Field of Search ................................... 455/561, 562, 455/73, 450, 129, 443, 444, 422, 446, 424, 560

[56] References Cited

U.S. PATENT DOCUMENTS

| | | | |
|---|---|---|---|
| 5,457,734 | 10/1995 | Eryaman et al. ........................ | 455/561 |
| 5,475,735 | 12/1995 | Williams et al. ....................... | 455/417 |
| 5,479,397 | 12/1995 | Lee ......................................... | 455/562 |
| 5,550,813 | 8/1996 | Vella-Coleiro ............................ | 455/73 |
| 5,576,717 | 11/1996 | Searle et al. ............................. | 455/562 |
| 5,633,915 | 5/1997 | Yang et al. ............................... | 455/443 |
| 5,781,865 | 7/1998 | Gammon .................................. | 455/561 |
| 5,859,854 | 1/1999 | Reudink .................................. | 370/480 |
| 5,887,267 | 3/1999 | Fugaro .................................... | 455/561 |
| 5,889,494 | 3/1999 | Reudink et al. ......................... | 342/373 |
| 5,894,598 | 4/1999 | Shoki ....................................... | 455/562 |
| 5,924,020 | 7/1999 | Forssen et al. .......................... | 455/129 |

FOREIGN PATENT DOCUMENTS

| | | | |
|---|---|---|---|
| 0639035 A1 | 2/1995 | European Pat. Off. ......... | H04Q 7/36 |
| 0725498 A1 | 8/1996 | European Pat. Off. .......... | H04B 7/36 |
| 0777400 A2 | 6/1997 | European Pat. Off. ......... | H04Q 7/36 |

OTHER PUBLICATIONS

PCT International Search Report on International application No. PCT/US 98/24119 (4 pages).

*Primary Examiner*—Reinhard J. Eisenzopf
*Assistant Examiner*—Duc Nguyen
*Attorney, Agent, or Firm*—Fulbright & Jaworski L.L.P.

[57] ABSTRACT

A system and method for providing independent sector mapping of signals associated with a first and second service utilizing a same multibeam antenna system is disclosed. In a preferred embodiment switch matrixes associated with each service are manipulated to selectably map sector patterns of each service. Additionally, to mitigate destructive cancellation caused by combining signals of multiple antenna beams having a signal associated with a particular sector, adjustable phase shifters and/or attenuators are provided in the signal paths.

60 Claims, 5 Drawing Sheets

INPUT SPECIFIC INDEPENDENT SECTOR MAPPING

REFERENCE TO RELATED APPLICATIONS

Reference is hereby made to the following, commonly assigned, U.S. patent applications: Ser. No. 08/582,525, now U.S. Pat. No. 5,884,147, entitled "Method and Apparatus for Improved Control Over Cellular Systems"; Ser. No. 08/651,981, now U.S. Pat. No. 5,745,841, entitled "System and Method for Cellular Beam Spectrum Management"; Ser. No. 08/808,304, entitled "Conical Omni-Directional Coverage Multibeam Antenna with Multiple Feed Network"; Ser. No. 08/786,725, now U.S. Pat. No. 5,889,494 entitled "Antenna Deployment Sector Cell Shaping System and Method"; and Ser. No. 08/924,285, entitled "Antenna Deployment Sector Cell Shaping System and Method"; the disclosures of which are incorporated herein by reference.

TECHNICAL FIELD OF THE INVENTION

The present invention relates in general to a cellular system having multiple inputs to a multibeam antenna system and more specifically to a system and method providing different sector orientations, sector azimuths and/or sector beam widths for different types of signals provided to the multiple inputs.

BACKGROUND OF THE INVENTION

In typical prior art cellular systems, the characteristics of sectors, i.e., the orientation, azimuth, beam width, size, etcetera, of a cell are fixed. Accordingly, the area of influence of signals associated with these fixed sectors are also fixed. However, it may be desirable to adjust characteristics of a sector in order to provide for a modified area of influence of signals associated with the adjusted sector.

Additionally, it may be desirable to provide communication of a plurality of different signals through a cellular antenna system of a single cell. For example, a particular service provider may have both analogue and digital service, possibly sharing the same spectrum, or frequency band, or occupying different spectrums, or frequency bands. However, for cost, physical, topological, or other limitations, the service provider may be limited to a single set of antennas at a given cell site to provide both the analogue and digital services.

Likewise, different service providers may be forced to share the same antenna at a cell site for zoning or other reasons. Here, the service providers are likely to be occupying different frequency bands, possibly with the same type of signal, i.e., analogue or digital, while sharing the same antennas.

However, in the above examples, it may be desirable to provide different sector characteristics for each of the different signal types. In the case of a service provider having both analogue and digital signals, for example, sector sizes or the number of sectors for each of the two types of signals may be different. In the case of two service providers utilizing a single cell site, it may be necessary, for example, for each service provider to maintain sectors at the shared site complementary to other cells in their respective networks. Accordingly, various attributes of each service provider's sectors, although emanating from a single set of antennas, may be required to be very different. Moreover, operation of the cell site according to the needs of the individual types of signals or services may require that these sector characteristics be alterable.

Accordingly, a need exists in the art for a system and method for providing independent sector mapping for various signals at a single cell site.

A further need exists in the art for a system and method for providing dynamically alterable sector characteristics independently for the various signals at the cell site.

A still further need exists in the art for a system and method for adjusting the characteristics of a sector in order to provide for a modified area of influence of signals associated with an adjusted sector.

SUMMARY OF THE INVENTION

These and other objects, features and technical advantages are achieved by a system and method which allows multiple inputs to an antenna system, such as may be separated in frequency or in time, to be independently switched to the various beams of a single multibeam antenna (for example, an antenna having 12 substantially non-overlapping beams) and, thus, provide independent sector mapping for each input. For example, where an analogue service and a digital service are provided as inputs in different frequency bands, the inputs are separated and routed to two different switch matrixes coupled to the multibeam antenna. Accordingly, completely independent and arbitrary connections of the analogue signals to the multibeam antenna and independent connections for the digital service are allowed. An example of deployment of such a system is where a system operator, already having a site lease and antenna structure in place, leases the antenna site for use by other service providers. The present invention allows for completely independent operation of the sectors for the collocated services, although the services utilize the same antenna system.

According to the present invention, the networks associated with the multiple services can be configured separately which is often desirable since there are differing requirements for the sector orientations for different types of networks. For example, an analogue network might require a very strict adherence to a grid system requiring that certain sectors of a number of antennas throughout the analogue network simultaneously point in a specific direction, such as for frequency reuse. Whereas, other types of networks, such as digital networks perhaps using code division multiple access (CDMA), may not have a requirement for a strict grid alignment and, thus, are free to utilize varied sector mapping throughout the digital network.

It shall be understood that a single multibeam antenna as discussed herein includes any antenna structure which provides multiple beams whether that antenna structure is a single physical antenna or a plurality of antennas which, when operated together, provide multiple beams. Regardless of the physical embodiment of the multibeam antenna structure, the present invention allows sharing of the same antenna structure by multiple services by providing different logical connections to the antenna beams for each service.

Connecting the input signals to the beams of the antenna to synthesize sector patterns according to the present invention, i.e., simulcasting on the forward link, transmission of a signal for a given sector over multiple beams of the multibeam antenna structure, is preferably used. However, in some cases, such as where the beams are generated from physical antennas that are separated in distance, there may be the occurrence of nulls in the synthesized sector pattern.

Therefore, a preferred embodiment of the present invention includes mitigation of the affects of these nulls in the synthesized sectors. Accordingly, a preferred embodiment utilizes a phase calibration technique equalizing the phases of the transmitted signals on the antenna beams, or a subset thereof. An alternative embodiment continuously dithers, or randomly changes the phase of, the signals from the antenna beams, or a subset thereof. Accordingly, if nulls in the transmitted pattern exist, they would not exist at specific geographic locations but they would be continuously moved around in a coverage area of the cell or sector such that, on average, the signal quality would be improved and the impact of the null is minimized.

Another alternative embodiment of the present invention utilizes amplitude adjustment of the individual signals of the antenna beams in order to mitigate the affects of nulls. Additionally, amplitude adjustment may be utilized in combination with the aforementioned phase calibration technique. Moreover, dithering of the amplitudes may be utilized as discussed with respect to phase adjustment.

Yet another alternative embodiment utilizes independent variable time delays associated with the individual signals of the antenna beams to mitigate the affects of nulls. Accordingly, the receivers may operate to select a particular signal, delayed in time with respect to other signals, such as through the use of a rake receiver or diversity.

Additionally, or alternatively, the present invention may operate with an antenna structure that places the physical phase center of all of the beams in very close proximity, such as within one wave length of one another, to minimize the need for the above mentioned mitigation techniques. Of course, even where the phase center of the beams are collocated, the use of the above mitigation techniques may be employed by the present invention in order to mitigate the affects of multi-path fading and the like.

Accordingly, it shall be appreciated that a technical advantage of the present invention is providing independent sector mapping for various signals at a single cell site.

A further technical advantage of the present invention is providing dynamically alterable sector characteristics independently for the various signals at the cell site.

A still further technical advantage of the present invention is realized in the systems and methods for mitigating nulling associated with the combination of multiple antenna beams in synthesizing a sector pattern.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

It shall be appreciated that various wireless communication services utilize a variety of schemes for providing comprehensive coverage of an area while providing sufficient communication capacity without an undesired level of interference from simultaneous wireless users. These schemes include the use of particular antenna radiation patterns, frequency reuse patterns, and multiple access techniques, such as frequency division multiple access (FDMA), time division multiple access (TDMA), and code division multiple access (CDMA).

Figure 1:
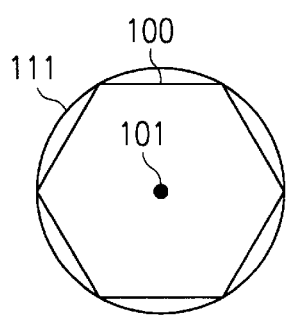
FIG. 1 illustrates an omni directional cellular radiation pattern.

For example, directing attention to FIG. 1, a cellular system may be utilized which includes cell 100 having antenna structure 101 radiating and/or receiving signals omni directionally as radiation pattern 111. Here, a particular frequency or set of frequencies may be assigned for use in cell 100, thus allowing a different set of frequencies to be used in a neighboring cell (not shown). Accordingly, a large geographic area may be serviced while providing simultaneous communication to multiple users, i.e., a user may utilize a frequency assigned to cell 100 anywhere throughout radiation pattern 111 while a user in another cell simultaneously uses a frequency associated with that other cell.

However, to provide improved signals and/or more capacity, a region of a wireless communication area may be subdivided. For example, directing attention to FIG. 2, a sectored cellular system, which includes cell 200 having antenna structure 201 radiating and/or receiving signals in three sectors as radiation patterns 211, 212, and 213, is shown. Here, a particular frequency or set of frequencies may be assigned for use in each of the sectors, thus allowing a denser reuse of the frequencies throughout the network. Accordingly, wireless communications within the cell, as well as the network, may be serviced simultaneously without unacceptable interference.

Figure 2:
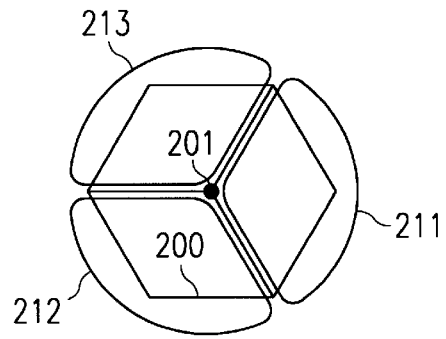
FIG. 2 illustrates a three sectored cellular radiation pattern.

It shall be appreciated that use of the above described radiation patterns for cells provide different advantages and drawbacks and, thus, may be more or less desirable for use in particular communication systems. For example, it is common today in analogue cellular systems, using FDMA, to use a three sectored cell such as shown in FIG. 2. Such a scheme is desirable in an analogue cellular network as increased call capacity may be realized. Through strategic assigning of frequencies to the various sectors of multiple cells, frequencies may be reused in the network and use of a frequency in one sector does not effect capacity in a nearby sector or cell. However, it shall be appreciated that in order to optimize the reuse of frequencies in such an analogue system it is desirable to orient sectors having the same frequency assigned in a particular direction so as to provide as dense a frequency reuse pattern as possible.

A digital system, such as a cellular network using CDMA having individual communications operating on one frequency band but with different codes, may utilize the omni directional cell of FIG. 1 in order to profit from the use of typically less expensive omni directional antenna structures. Alternatively, a CDMA cellular system may take advantage of a sectored system such as illustrated in FIG. 2 in order to reduce the energy level experienced in particular radiation patterns, while simultaneously servicing multiple users. It shall be appreciated that, as the communications of the CDMA system are using the same frequency band, the orientation of sectors of particular cells with respect to other cells is not of paramount concern, but rather the total energy radiated in a particular area is of primary concern.

From the above, it is shown that different wireless services may benefit from the use of different sector attributes associated with radiation patterns servicing the same area. Moreover, these services may further benefit from the ability to change the sector attributes independently from the other service. However, heretofore the provision of different sector attributes, dynamically adjustable for individual services, has not been provided.

Figure 3:
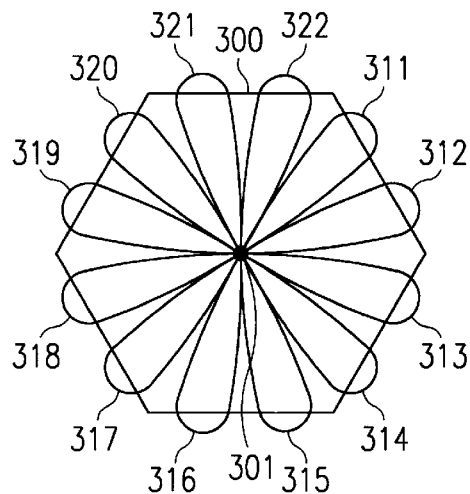
FIG. 3 illustrates a twelve narrow beam cellular radiation pattern.

Directing attention to FIG. 3, a multibeam cellular system, which includes cell 300 having antenna structure 301 radiating and/or receiving signals in twelve narrow beams as radiation patterns 311–322, is shown. Apparatus adapted to provide multiple narrow beams as illustrated are disclosed in the above reference U.S. patent application entitled "Conical Omni-Directional Coverage Multibeam Antenna with Multiple Feed Network."

Figure 4:
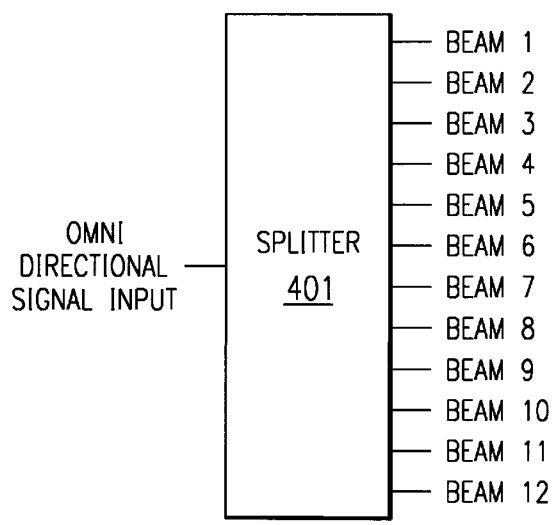
FIG. 4 illustrates a block diagram of a system to synthesize an omni directional cellular radiation pattern utilizing a twelve narrow beam cellular radiation pattern.
Figure 5:
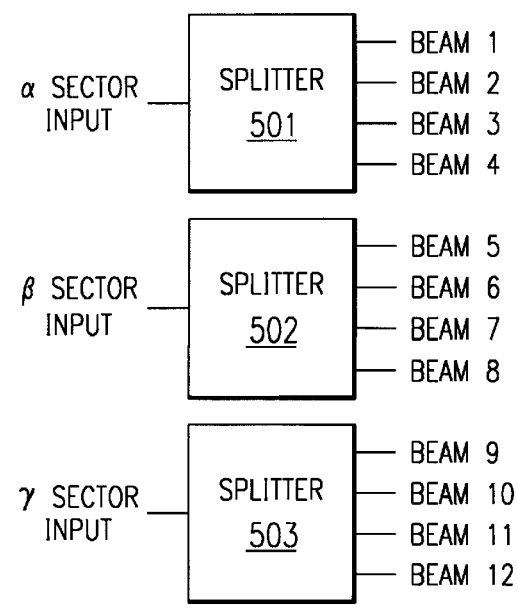
FIG. 5 illustrates a block diagram of a system to synthesize a three sectored cellular radiation pattern utilizing a twelve narrow beam cellular radiation pattern.

It is possible to synthesize the radiation patterns of various cellular systems, such as those illustrated in FIGS. 1 and 2, by providing signals to the appropriate beams of a multibeam cell, such as cell 300. For example, directing attention to FIG. 4, the omni directional radiation pattern of cell 100 may be synthesized by providing an omni directional signal to each antenna beam, such as through splitter 401. Likewise, directing attention to FIG. 5, the three sectored radiation pattern of cell 200 may be synthesized by providing the first sector signal to beams 1–4, through splitter 501, the second sector signal to beams 5–8, through splitter 502, and the third sector signal to beams 9–12, through splitter 503. However, the above described systems do not provide for the independent synthesis of sectors associated with differing services by a single antenna structure. Likewise, the above described systems do not provide for the dynamic adjusting of the sectors synthesized.

Figure 6A:
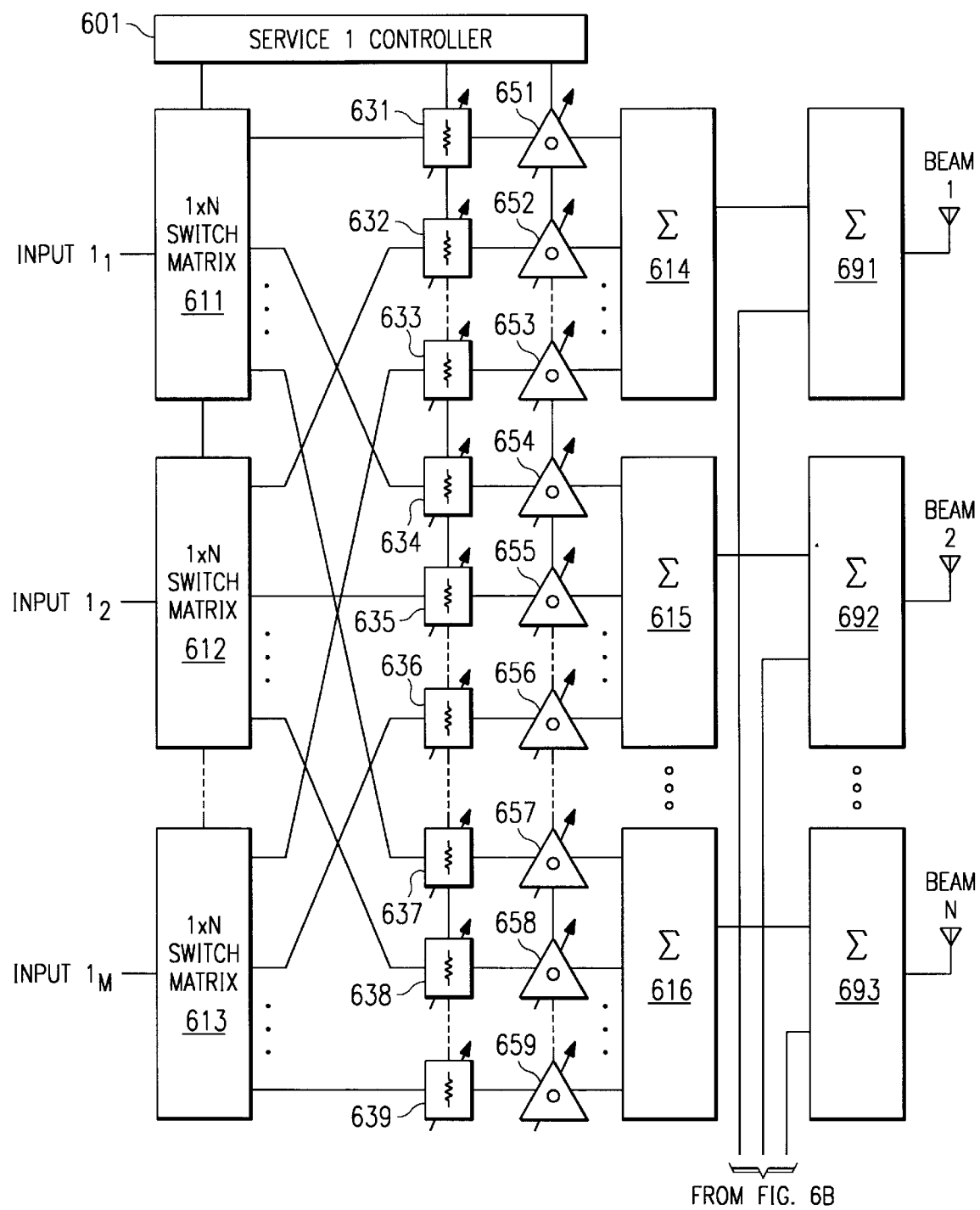
FIG. 6 illustrates a block diagram of a system in the forward signal path to dynamically synthesize radiation patterns for multiple services utilizing a narrow beam cellular radiation pattern.
Figure 6B:
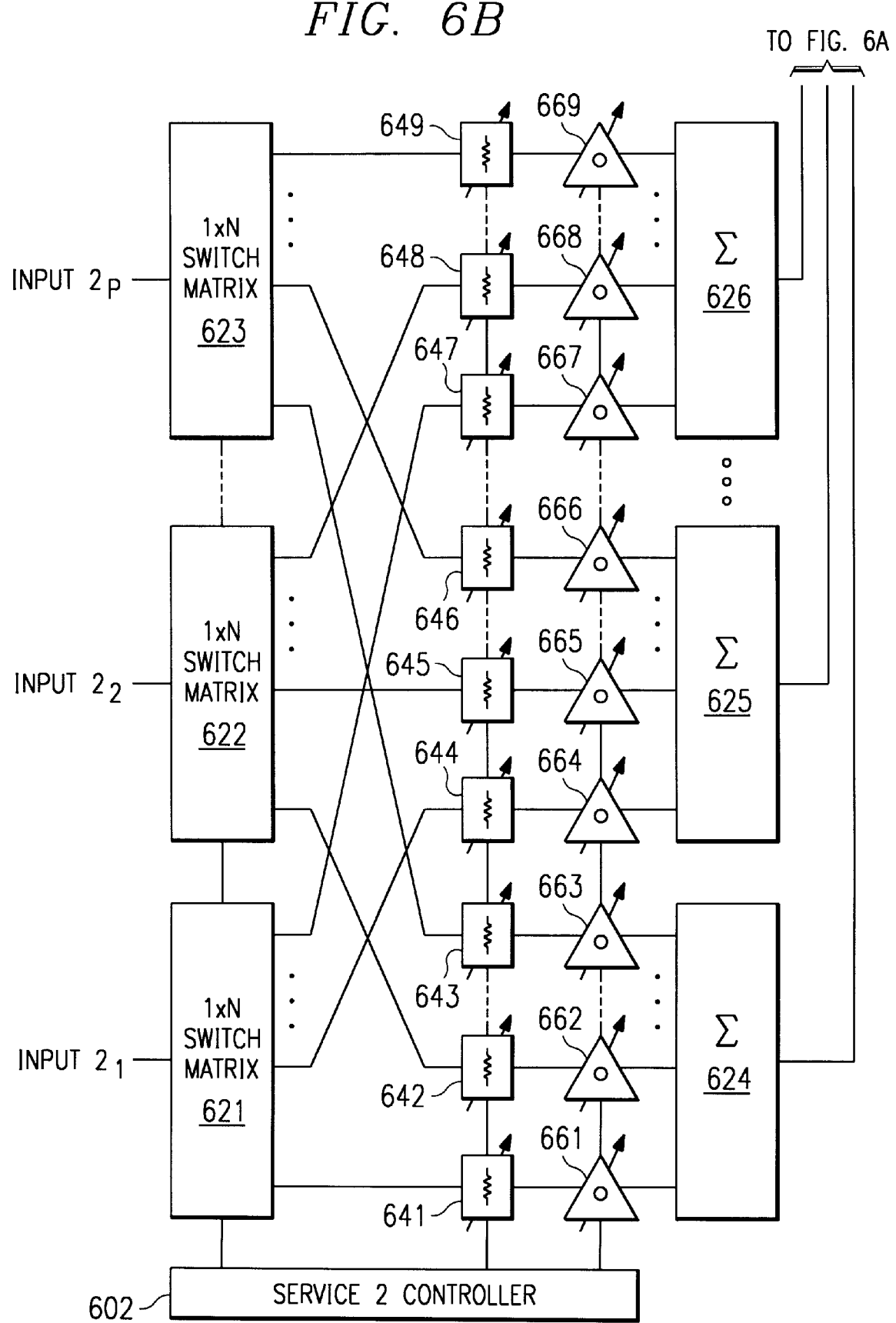

Directing attention to FIG. 6, a preferred embodiment of the present invention is shown which is adapted to provide independent synthesization of sectors for different services which sectors are dynamically adjustable. In order to provide independent synthesization of sectors for multiple services, circuitry is provided for each such service. Illustrated are service controller 601, switch matrixes 611–613, adjustable attenuators (and/or adjustable amplifiers) 631–639, adjustable phase shifters 651–659, and signal combiners 614–616 associated with a first service. Also illustrated are service controller 602, switch matrixes 621–623, adjustable attenuators (and/or adjustable amplifiers) 641–649, adjustable phase shifters 661–669, and signal combiners 624–626 associated with a second service. Signal combiners 691–693 are provided to combine the signals of each service switched for a particular beam. A single stage of signal combiners, having M+P inputs to one output, may be used in place of the two stages of signal combiners shown, replacing signal combiners 614–616, 624–626, and 691–693.

It shall be appreciated that the circuitry illustrated in FIG. 6 may be scaled for any number of services by adding circuitry, such as that described above for each service, to accommodate any additional services. Also, the number of inputs associated with the various services may be any scale. The number of inputs associated with the first service, shown as M inputs, and the number of inputs associated with the second service, shown as P inputs, may be any number. For example, M and P may be the number of sector outputs, and/or diversity outputs, of transceiver equipment utilized in the cell. Likewise, the number of antenna beams, shown as N beams, may be any number, realizing of course that the number and size of these beams directly affects the characteristics of the sectors synthesized using the beams.

In order to synthesize the desired radiation patterns, the present invention operates to switch a particular input associated with the desired radiation pattern, i.e., a sector output of a cell site transmitter, to a selected number of the antenna beams determined to produce the desired radiation pattern. For example, where the number of beams N of the preferred embodiment of FIG. 6 is twelve and the number of inputs of the first service M is three, a three sectored cell may be synthesized as illustrated in FIG. 2 for this first service by properly switching switch matrixes 611–613. To provide the signal of input $1_1$ in an area corresponding to sector 211 of FIG. 2, switch matrix 611 is manipulated to provide input $1_1$ to antenna beams 1–4. Similarly, the signals of input $1_2$ are provided to antenna beams 5–8 and the signals of input $1_M$ are provided to antenna beams 9–12 through manipulation of switch matrixes 612 and 613 respectively. Accordingly, the sector width and azimuth is a function of the number of beams, and their beam width, associated with the sector signal. Similarly, the orientation of the sector is a function of the particular beams. Therefore, these attributes may be altered through selection of the antenna beams.

It shall be appreciated that, although the inputs of the first service are mapped to a three sector arrangement in the example above, the switch matrixes associated with the second service are unaffected and, thus, available for manipulation independently. Accordingly, the signals of the second service may be simultaneously mapped, manipulating the switch matrixes as described above, to sectors having different characteristics than those of the first service.

It shall be appreciated that the switching of signals to beams according to the present invention is not limited to non-overlapping sectors as described in the above example. By switching multiple input signals to a same beam, sectors may be defined which overlap, or partially overlap, if desired. Overlapping mapping of beams to inputs or outputs may be of particular use in providing for diversity transmission or reception. Moreover, there is no requirement that all of the available beams be used in the sector mapping of the present invention. For example, where coverage is not required in an area, the antenna beams associated therewith may not be switched to any input signal.

Moreover, it shall be appreciated that the size and orientation of sectors synthesized according to the present invention are limited only by the particular beams to which a signal is switched. Accordingly, the sectors of the present invention may be controlled to provide a different azimuth grid point alignment as desired, such as to conform to local traffic, terrain features, blockages, or interference (in-band or out-of-band) conditions.

In order to provide automated manipulation of the switch matrixes of the present invention, a service controller is coupled thereto as shown. For example, service controller 601 adapted to manipulate switch matrixes 611–613 is provided to form radiation patterns desirable for the first service. Likewise, service controller 602 adapted to manipulate switch matrixes 621–623 is provided to form radiation patterns desirable for the second service. It shall be appreciated that although discrete service controllers are illustrated, these devices may in fact be embodied in a single unit. Likewise, the service controller(s) utilized at a particular cell may also be utilized throughout the cellular network, or portion thereof, in order to provide complementary control at multiple cell sites.

The service controllers of the present invention are control systems adapted to determine desired radiation patterns for the input signals associated with a corresponding service and to manipulate the coupled switch matrixes to achieve these radiation patterns. Accordingly, the service controllers may be embodied in a computer system operating under control of instructions for providing output signals suitable to manipulate the switch matrixes. The instructions may operate in response to various inputs, such as monitored aspects of the cellular network, including mobile communication unit positions, signal strengths, interference levels, load distributions, and the like, provided with respect to communications within the cell and/or other cells throughout the network. Additionally, the instructions may operate autonomously such as through reference to a particular time of day or day of week as might be related to a database of desired sector mapping associated with particular times.

A system adapted to control the operation of a cell site which may be used in conjunction with the service controllers of the present invention is disclosed in the above referenced U.S. patent application entitled "Method and Apparatus for Improved Control Over Cellular Systems." The system disclosed therein monitors communications throughout a cellular network in order to intelligently control the operation of the cell sites. The communication attributes monitored therein, as well as the systems and methods for determining appropriate control of the network, may be utilized by the service controllers of the present invention.

It shall be appreciated that, where the antenna structure providing the various beams utilized by the present invention are physically separated by an appreciable distance, or otherwise cause destructive relationships for a signal simulcast over multiple beams, nulls may be produced in portions of the combined radiation pattern, or synthesized sector, where there is beam overlap. I.e., in the preferred embodiment of FIG. 6, signals to be associated with a particular synthesized sector are split and provided to antenna structure associated with individual beams defining the synthesized sector, therefore a synthesized sector signal may in fact radiate from several discrete points. Accordingly, where these points are separated in space by an appreciable distance, the wave fronts from each of these beams may combine destructively to form nulls in overlapping areas where, for example, the signal of two such beams are 180° out of phase. As nulls cause loss of signals or otherwise undesirable effects on wireless units operating in an area of the null, it is desirable to mitigate their effect.

Accordingly, a preferred embodiment of the present invention is adapted so as to adjust signals simulcast over multiple antenna beams to mitigate the effect of nulls. Directing attention again to FIG. 6, adjustable phase shifters 651–659 and 661–669 are provided in the signal path of each beam signal so as to allow for independent manipulation of the signals. The adjusted phase shift may be produced by digital signal processing, in-phase and quadrature (I/Q) combining circuitry, switching predetermined lengths of transmission cable in and out of the signal path, or the like. Through intelligent adjusting of the phase shifters associated with a particular synthesized sector, signals provided to the beams of the synthesized sector may be individually phase shifted so as to eliminate undesired nulls and produce a coherent radiation pattern.

Preferably, intelligent control of the phase shifters is provided by the service controllers operating to control the switch matrixes defining the synthesized sectors, as shown in FIG. 6. Accordingly, the processor of the service controller preferably includes instructions to properly adjust phase shifters complementary with the controlling of the switch matrixes. Of course, independent control systems may be provided for the switch matrixes and the adjustable phase shifters, if desired. For example, where the various antenna beams radiate from fixed sources, having a known relationship to the other sources, an adjustable phase shifter controller may operate in response to the switching of the associated switch matrixes to properly adjust the phases of signals of beams used in a synthesized sector. Accordingly, the known relationship of the various sources and information as to the particular antenna beams a signal is switched may be used to properly adjust the phase shifters, such as through the use of a lookup table of phase adjustments used with particular synthesized sector arrangements.

However, it shall be appreciated that the shifting of phases of the signals of individual beams of the synthesized sector, where the radiation sources of the beams are separated in space, may operate to create nulls in other overlapping areas. Accordingly, the use of the phase shifters as described above may operate to create a synthesized sector having a radiation pattern somewhat different than that of a composite of each of the individual beams, similar to that resulting from phased array beam forming techniques. This may be undesirable in some circumstances, such as where the beam formed is more narrow than the desired sector.

Therefore, in an alternative embodiment of the present invention, the phase shifters are adjusted continuously, preferably pseudo-randomly, to dither the above mentioned nulls. Accordingly, the full area of the beams utilized to synthesize a sector may be available for communication. As the phase shifters are constantly adjusted, areas are only briefly affected by destructive nulls, thus distributing the effects of such destructive nulls throughout the synthesized sector.

It shall be appreciated that each of the phase shifters of this embodiment of the present invention may be autonomously continually adjusted, thus obviating the need for a connection to a control system as described above. Of course, the continuous adjustment of the phase shifters may be under the control of an external control system, such as the aforementioned service controllers as illustrated, if desired.

Moreover, it shall be appreciated that a combination of both intelligent control and continuous adjustment of the phase shifters may be employed according to the present invention. For example, where intelligent control of the phase shifters to mitigate a null in a particular area results in the creation of an undesired null in another particular area, continuous adjustment may be utilized to alternate between various selected adjustments to distribute the effects of the nulls between preselected areas.

In addition to the adjustable phase shifters described above, the preferred embodiment of the present invention also includes adjustable attenuators 631–639 and 641–649. Of course, attenuators 631–639 and/or 641–649 may be included without the use of corresponding ones of the aforementioned phase shifters, if desired. It shall be appreciated that, although being described as attenuators, these devices may in fact impart the functionality of amplifiers and/or attenuators. As with the above described adjustable phase shifters, the adjustable attenuators of the present invention are provided in the signal path of each beam signal so as to allow for independent manipulation of the signals.

Through intelligent adjusting of the attenuators associated with a particular synthesized sector, signals provided to the beams of the synthesized sector may be individually amplitude adjusted so as to eliminate or mitigate undesired nulls. For example, it may be determined that a particular beam signal, which in an area of the synthesized sector is 180° out of phase with a signal of an overlapping beam, does not require full amplitude to service wireless communications. Accordingly, the amplitude of this signal may be attenuated by the adjustable attenuator in the signal path associated with that particular antenna beam such that where the antenna beams overlap, this signal's amplitude is insufficient to cause a complete cancellation of the combined signals. Alternatively, or additionally, the amplitude of a signal which destructively combines with the above mentioned signal may be amplified in order to avoid complete cancellation of the combined signals.

As with the adjustable phase shifters described above, control of the adjustable attenuators may be autonomous or by an independent control system. However, in a preferred embodiment, intelligent control of the attenuators is provided by the service controllers operating to control the switch matrixes defining the synthesized sectors, as shown in FIG. 6, in order to utilized information such as the signal strength, mobile position, or other information already available to the service controllers. Accordingly, the processor of the service controller preferably includes instructions to properly adjust the attenuators complementary with the controlling of the switch matrixes.

Figure 8:
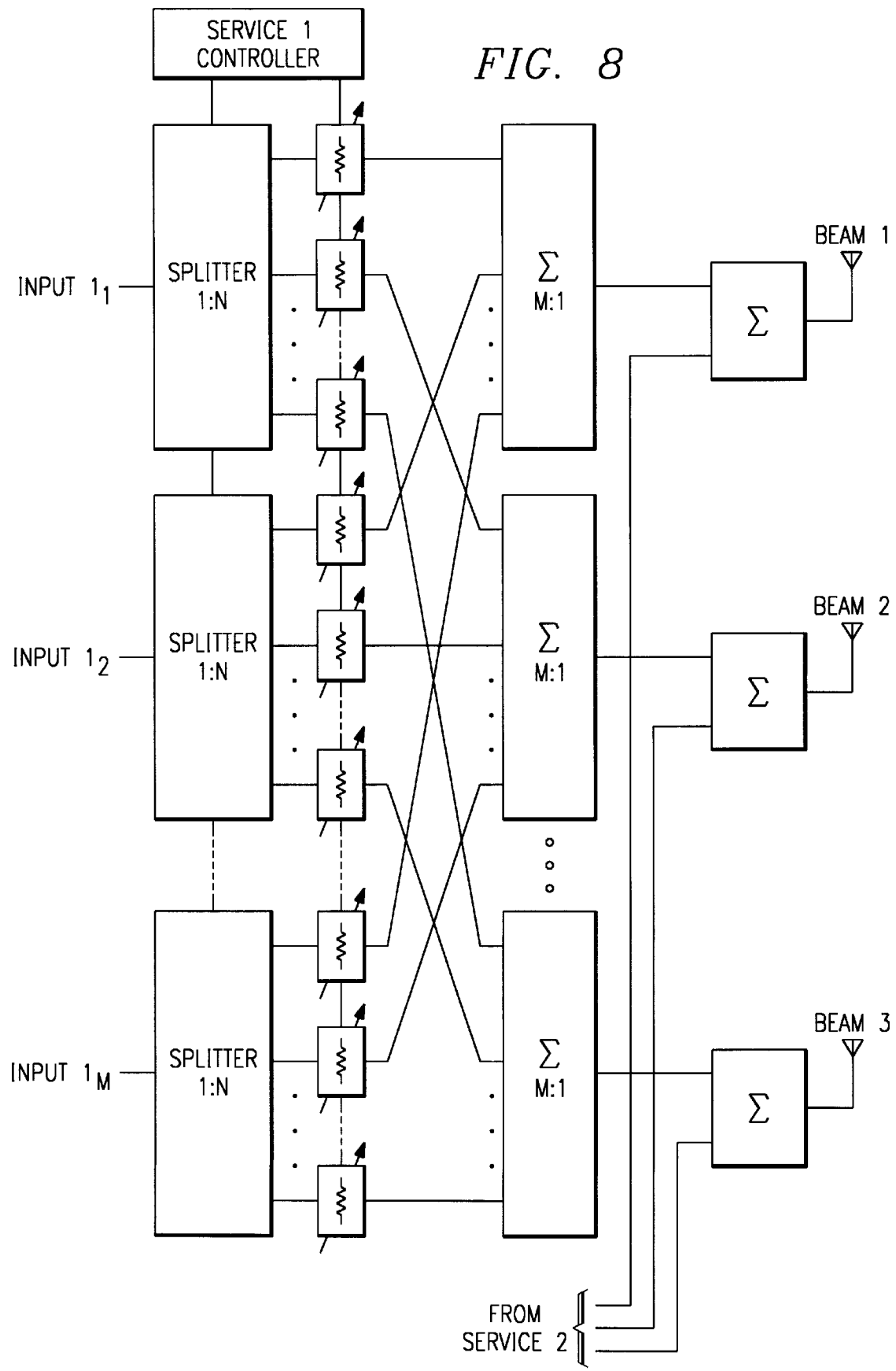
FIG. 8 illustrates an alternative block diagram of a system in the forward signal path to dynamically sythesize radiation patterns for multiple services utilizing a narrow beam cellular radiation pattern.

Moreover, it shall be appreciated that, in a preferred embodiment, the attenuators of the present invention may be operated to act as on/off switching devices with respect to signals being communicated to the antenna beams, i.e., attenuation of signals approaching infinity to effectively switch "off" a signal. Accordingly, signal routing may be dynamically controlled through the use of these attenuators, such as through operation of the aforementioned service controller. Therefore, in an alternative embodiment, the switch matrixes are replaced with the use of attenuators to provide the switchable connections between the service interfaces and the antenna interfaces. In this embodiment, splitters may be provided for each service interface so as to provide a sufficient number of each signal for provision to a desired number of antenna beams. Attenuators are placed in the signal paths of each of these split signals and are then controlled to allow only desired signals to pass to a particular antenna beam. The portion of the circuitry associated with a first service adapted to utilize the attenuators as switching devices is illustrated in FIG. 8.

In addition to the phase shifters and attenuators described above, an alternative embodiment of the present invention utilizes variable time delay elements (not shown) in the signal path associated with each antenna beam to introduce independent time delays with respect to the signals. The delay elements may be provided through the use of such signal delay techniques as switching in and out various lengths of transmission cable, through the use of surface acoustic wave (SAW) devices, or the like. These time delay elements may be included with or without the use of corresponding ones of the phase shifters and/or attenuators, if desired.

Through adjusting the time delays associated with the antenna beams of a particular synthesized sector, the aforementioned undesired nulls in the radiated signals may be eliminated or mitigated. For example, through the use of a diversity receiver, the mobile units may be able to select a best antenna beam signal, staggered in time with respect to other antenna beam signals of the sector. Likewise, the use of a rake receiver may provide improved reception through the use of various delays in the antenna beam signals of a synthesized sector.

As with the adjustable phase shifters described above, control of the time delay elements may be autonomous or by an independent control system. However, in a preferred embodiment, intelligent control of the time delay elements is provided by the service controllers operating to control the switch matrixes defining the synthesized sectors in order to utilized information such as the antenna beams utilized in synthesizing a sector, mobile position, or other information already available to the service controllers. Accordingly, the processor of the service controller preferably includes instructions to properly adjust the time delay elements complementary with the controlling of the switch matrixes.

Although discussed with reference to the forward, or transmit, signal path, it shall be appreciated that the present invention is also operable in the reverse, or receive, signal path. Accordingly, signal splitters in the receive signal path, corresponding to the placement of the signal combiners in the forward signal path, may be utilized to provide the antenna beam signals to switch matrixes to synthesize sectors in the receive path.

Figure 7:
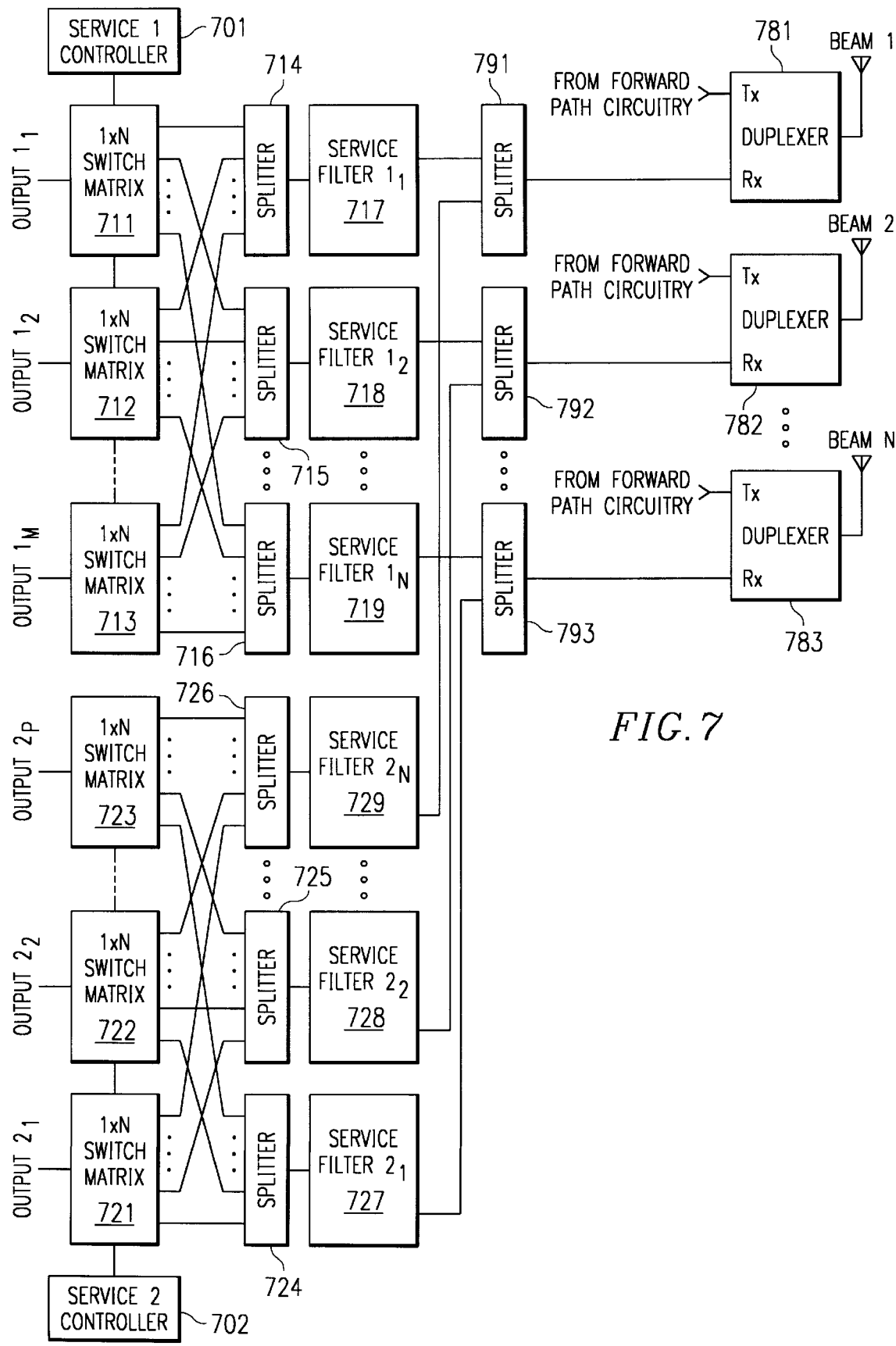
FIG. 7 illustrates a block diagram of a system in the reverse signal path to dynamically synthesize radiation patterns for multiple services utilizing a narrow beam cellular radiation pattern.

Directing attention to FIG. 7, a preferred embodiment of the present invention deployed in the reverse signal path is illustrated. In order to provide independent synthesization of sectors for multiple services, circuitry is provided for each such service. As it is anticipated that the present invention will be utilized in both the forward and reverse signal paths, duplexers, such as duplexers 781–783 shown coupled to the antenna, are included in a preferred embodiment. Of course, where separate antennas are used in the forward and reverse links, or where only a forward or reverse link is used, the duplexers may be eliminated, if desired.

Illustrated are switch matrixes 711–713, signal splitters 714–716, service filters 717–716, and service controller 701 associated with a first service. Also illustrated are switch matrixes 721–723, signal splitters 724–726, service filters 727–729, and service controller 702 associated with a second service. Signal splitters 791–793 are provided to split the signals of the antenna beams for each service. However, a single stage of signal splitters having one input to M+P outputs may be used in place of the two stages of signal splitters shown, replacing signal splitters 714–716, 724–726, and 791–793.

It shall be appreciated that signal splitters 714–716, 724–726, and 791–793 are disposed in the receive signal path corresponding to the placement of signal combiners 614–616, 624–626, and 691–693. The signal splitters are utilized to provide signals between the antenna beams and switch matrixes, such as switch matrixes 711–713 and 721–723, as described above with respect to the forward path. Accordingly, a signal provided in any of the antenna beams is split such that it is provided at each of the switch matrixes of a service. As described above with respect to the transmit path, the present invention operates to switch a particular signal associated with a selected number of the antenna beams to a particular output to synthesize the desired radiation pattern.

Preferably, intelligent control of switch matrixes 711–713 and 721–723 is provided by the service controllers operating to control switch matrixes 611–613 and 621–623. Accordingly, service controllers 701 and 702 are preferably embodied in service controllers 601 and 602 respectively. Of course service controllers 701 and 702 may be discrete from the forward path service controllers, if desired. In any case, service controllers 701 and 702 defining the synthesized sectors in the receive link preferably include a processor and instructions to properly control the switch matrixes.

Service filters 717–719 and 727–729 are provided in the receive signal path in order to isolate the particular portions of the antenna beam signals associated with a particular service. For example, where the signals of service 1 and service 2 are distinguished through the use of different frequency bands, service filters 717–719 may be band pass filters adapted to allow the frequency band of the first service to pass. Likewise, service filters 727–729 may be band pass filters adapted to allow the frequency band of the second service to pass. Of course, where the receivers coupled to outputs $1_1$–$1_M$ and $2_1$–$2_P$ are adapted to isolate the signals of interest, the use of the service filters may be eliminated, if desired. However, even where the receivers are so adapted, use of the service filters may be maintained to improve signal quality as provided to the receivers.

Where the signals of the services utilizing the present invention are distinguished through such methods as codes, i.e, CDMA, or timing, i.e., TDMA, the service filters may require the use of control signals, such as code or timing information, in order to properly filter a service's signals. Accordingly, connections may be provided between service controllers 701 and 702 and the service filters associated with the respective service.

It shall be appreciated that service filters, such as those described above, may also be utilized in the forward signal path. For example, where the signals of two services are initially provided as a combined signal, rather than the discrete signals illustrated in FIG. 6, service filters may be utilized to isolate signals associated with the proper service for provision to the appropriate service circuitry of the present invention.

It shall be appreciated that, as with the circuitry of FIG. 6, the circuitry illustrated in FIG. 7 may be scaled for any number of services by adding circuitry, such as that described above for each service, to accommodate any additional services. Also, the number of inputs associated with the various services may be any scale. The number of inputs associated with the first service, shown as M outputs, and the number of inputs associated with the second service, shown as P outputs, may be any number. Likewise, the number of antenna beams, shown as N beams, may be any number, realizing of course that the number and size of these beams directly affects the characteristics of the sectors synthesized using the beams.

It shall be appreciated that adjustable phase shifters and/or adjustable attenuators, as illustrated in FIG. 6, may be utilized in the receive path to mitigate the effects of destructive combining of signals, if desired. As with the phase shifters and adjustable attenuators of FIG. 6, those of the reverse signal path may be controlled by the service controllers or by other means described above.

Although the use of sector synthesizing has been discussed with respect to each of the services utilizing the present invention, it shall be appreciated that there is no limitation to the present invention operating with other beam selection schemes. For example, a service, such as a third service coupled to the illustrated circuitry, may be substantially permanently adapted to provide signals to particular antenna beams and, thus, continuously operate with a predefined sector mapping. Likewise, rather than adjusting sector mapping, a service may utilize particular antenna beams according to that service's communication protocol. One such system, utilizing beam switching to select particular beams having a strongest signal or other desired attribute, rather than a particular sector mapping, which may be utilized in combination with the present invention is disclosed in the above referenced U.S. patent application entitled "System and Method for Cellular Beam Spectrum Management."

It shall be appreciated that, although the specific examples herein have been discussed with respect to a twelve beam multibeam antenna system, the present invention may utilize any number of antenna beams deemed advantageous. Moreover, antenna beams utilized to synthesize sectors according to the present invention are not limited to the substantially uniform beams illustrated, but may include various beams sizes and/or shapes.

Although the present invention and its advantages have been described in detail, it should be understood that various changes, substitutions and alterations can be made herein without departing from the spirit and scope of the invention as defined by the appended claims.

What is claimed is:

1. A system for providing independent pattern mapping for signals of a plurality of different services to a multibeam antenna, said system comprising:

means for switchably coupling each signal interface of a plurality of signal interfaces to at least one selected antenna interface of a plurality of antenna interfaces, wherein said plurality of signal interfaces include a first set of signal interfaces associated with a first service of said plurality of services and a second set of signal interfaces associated with a second service of said plurality of services and said coupling means includes a first set of coupling means associated with said first set of signal interfaces and a second set of coupling means associated with said second set of signal interfaces, and wherein each antenna interface of said plurality of antenna interfaces is associated with a predefined antenna beam of said multibeam antenna; and means for controlling said coupling means, wherein said controlling means includes means for controlling said first set of said coupling means independently from said second set of said coupling means, wherein said first controlling means operates to control said first set of coupling means to define a pattern for said first service as a function of the particular said at least one selected antenna interface ones of said first set of signal interfaces are coupled, and wherein said second controlling means operates to control said second set of coupling means to define a pattern for said second service as a function of the particular said at least one antenna interface ones of said second set of signal interfaces are coupled, and wherein said pattern for said first service and said pattern for said second service are different.

2. The system of claim 1, wherein said controlling means utilizes information with respect to communications associated with said first service and said second service in controlling said coupling means.

3. The system of claim 1, further comprising:
means for adjustably introducing a phase shift between a particular signal interface of said first set of signal interfaces and at least one of said at least one selected antenna interfaces coupled to said particular signal interface by said coupling means.

4. The system of claim 3, wherein said phase shift introducing means is adjusted as a function of said particular antenna interfaces ones of said first set of signal interfaces are coupled.

5. The system of claim 1, further comprising:
means for adjustably introducing an amplitude change in a signal path between a particular signal interface of said first set of signal interfaces and at least one of said at least one selected antenna interfaces coupled to said particular signal interface by said coupling means.

6. The system of claim 5, wherein said amplitude change introducing means is adjusted as a function of said particular antenna interfaces ones of said first set of signal interfaces are coupled.

7. The system of claim 5, wherein said switchably coupling means includes said amplitude change introducing means, and wherein switchable coupling of said first set of signal interfaces to said plurality of antenna interfaces is provided through attenuation of signals under control of said controlling means.

8. The system of claim 1, further comprising:
means for adjustably introducing a time delay in a signal path between a particular signal interface of said first set of signal interfaces and at least one of said at least one selected antenna interfaces coupled to said particular signal interface by said coupling means.

9. The system of claim 8, wherein said time delay introducing means is adjusted as a function of said particular antenna interfaces ones of said first set of signal interfaces are coupled.

10. The system of claim 9, further comprising:
first means for filtering disposed between each said signal interface of said first set of signal interfaces and each antenna interface of said plurality of antenna interfaces, said first filtering means operable to substantially isolate signals associated with said first service; and
second means for filtering disposed between each said signal interface of said second set of signal interfaces and each antenna interface of said plurality of antenna interfaces, said second filtering means operable to substantially isolate signals associated with said second service.

11. The system of claim 1, wherein said coupling means comprises:
at least one switch matrix associated with each signal interface of said first set of signal interfaces; and
at least one switch matrix associated with each signal interface of said second set of signal interfaces.

12. The system of claim 1, wherein said plurality of signal interfaces are associated with wireless base station radio inputs.

13. The system of claim 1, wherein said plurality of signal interfaces are associated with wireless base station radio outputs.

14. The system of claim 1, wherein said first service utilizes a signal protocol selected from the group consisting of:
CDMA;
analogue;
TDMA; and
FDMA.

15. The system of claim 14, wherein said second service utilizes a different one of said signal protocols of said group than does said first service.

16. The system of claim 14, wherein said first and second services utilize a same one of said signal protocols of said group.

17. The system of claim 16, wherein said first and second services use of said same signal protocol are separated in time.

18. The system of claim 16, wherein said first and second services use of said same signal protocol are separated in frequency.

19. The system of claim 16, wherein said first and second services use of said same signal protocol are separated in code.

20. The system of claim 14, wherein said second service utilizes beam switching of a beam having a strongest attribute with respect to a particular signal.

21. A system for providing independent sector mapping for a plurality of services operating on a same multibeam antenna having a plurality of antenna beam interfaces, wherein each of said services has associated therewith at least one sector signal interface, said system comprising:
first means for switchably coupling each sector signal interface of a first one of said plurality of services to any antenna beam interface of said plurality of antenna beam interfaces;
second means for switchably coupling each sector signal interface of a second one of said plurality of services to any antenna beam interface of said plurality of antenna beam interfaces;
means for dynamically controlling said first coupling means to couple each sector signal interface of said first service to selected ones of said antenna beam interfaces, said sector mapping of said first service being a function of said selected antenna beam interfaces coupled to said sector signal interfaces of said first service; and
means for dynamically controlling said second coupling means to couple each sector signal interface of said second service to selected ones of said antenna beam interfaces, said sector mapping of said second service being a function of said selected antenna beam interfaces coupled to said sector signal interfaces of said second service, wherein said first and second controlling means operate to independently map said first and said second service sectors to thereby provide a multiple beam sector for at least one of said first and said second services.

22. The system of claim 21, further comprising:
means for shifting a phase of a signal associated with a particular sector signal interface of said first service, said phase shift being selected to mitigate signal cancellation caused by destructive combining of a plurality of signals associated with said particular sector signal interface of said first service.

23. The system of claim 22 wherein said sector mapping of said first service is a function of at least one monitored communication attribute with respect to said first service.

24. The system of claim 23, wherein said communication attribute includes a measure of a number of users of said first service.

25. The system of claim 23, wherein said communication attribute includes a measurement of a distribution of users of said first service.

26. The system of claim 21, further comprising:
means for changing an amplitude of a signal associated with a particular sector signal interface of said first service, said amplitude change being selected so as to mitigate signal cancellation caused by destructive combining of a plurality of signals associated with said particular sector signal interface of said first service.

27. The system of claim 21, further comprising:
means for delaying a signal associated with a particular sector signal interface of said first service, said delay being selected so as to improve reception of at least one of a plurality of signals associated with said particular sector signal interface of said first service.

28. The system of claim 21, further comprising:
means for filtering signals communicated between each sector signal interface of said first service and said coupled antenna beam interfaces to substantially isolate signals associated with said first service.

29. The system of claim 21, wherein said first coupling means comprises:
a switch matrix associated with a sector signal interface of said first service, said switch matrix adapted to provide switchable coupling between said associated sector signal interface and any combination of ones of said antenna beam interfaces; and
a switch matrix associated with a sector signal interface of said second service, said switch matrix adapted to provide switchable coupling between said associated sector signal interface and any combination of ones of said antenna beam interfaces.

30. The system of claim 21, wherein said first coupling means comprises:
a splitter associated with a sector signal interface of said first service, said splitter providing a split sector signal interface of said first service associated with each of said antenna beam interface of said plurality of antenna beam interfaces;
an attenuator associated with each split sector signal interface of said first service, each said attenuator operable under control of said controlling means to switchably pass a signal;
a splitter associated with a sector signal interface of said second service, said splitter providing a split sector signal interface of said second service associated with each of said antenna beam interface of said plurality of antenna beam interfaces; and
an attenuator associated with each split sector signal interface of said second service, each said attenuator operable under control of said controlling means to switchably pass a signal.

31. The system of claim 21, wherein said plurality of signal interfaces are associated with a cellular base transceiver station radio inputs.

32. The system of claim 21, wherein said plurality of signal interfaces are associated with a cellular base transceiver station radio outputs.

33. The system of claim 21, wherein said first service is digital and said second service is analogue.

34. The system of claim 21, wherein said sector mapping of said first service provides dynamic selection of a sector azimuth of said first service.

35. The system of claim 21, wherein said sector mapping of said first service provides dynamic selection of a sector orientation of said first service.

36. The system of claim 21, wherein said sector mapping of said first service provides dynamic selection of a sector width of said first service.

37. The system of claim 21, wherein said sector mapping of said first service is a function of information from a database with respect to mapping of said first service.

38. The system of claim 37, wherein said information is associated with a particular time.

39. The system of claim 21, wherein sector mapping of said first service under control of said first mentioned controlling means operates to provide a plurality of partially overlapping sector radiation patterns associated with said first service, wherein said partially overlapping sector radiation patterns share at least one antenna beam of said multibeam antenna.

40. A method for providing independent sector mapping for a plurality of services using an antenna system providing a plurality of antenna beam interfaces, wherein each of said plurality of services has associated therewith at least one sector signal interface, said method comprising the steps of:
providing switchable connections between each sector signal interface of said plurality of services and at least two antenna beam interfaces of said plurality of antenna beam interfaces, wherein ones of said sector signal interfaces of said plurality of services are simultaneously connectable to a plurality of said at least two antenna beam interfaces;
dynamically controlling said switchable connections to provide signal communication between sector signal interfaces associated with particular services of said plurality of services and selected ones of said antenna beam interfaces, wherein said sector mapping of each said service is a function of said selected antenna beam interfaces coupled to said sector signal interfaces associated with said service, and wherein switchable connections associated with each service of said plurality of services are controlled independently of switchable connections associated with other services of said plurality of services.

41. The method of claim 40, further comprising the step of:
shifting a phase of a signal associated with a particular sector signal interface to mitigate signal cancellation caused by destructive combining of said signal with other signals associated with said particular sector signal interface.

42. The method of claim 41, wherein said phase shifting step includes the step of:
selecting said phase shift as a function of said selected ones of said antenna beam interfaces switchably coupled to said particular sector signal interface.

43. The method of claim 40, further comprising the step of:
changing an amplitude of a signal associated with a particular sector signal interface to mitigate signal cancellation caused by destructive combining of said signal with other signals associated with said particular sector signal interface.

44. The method of claim 43, wherein said amplitude changing step comprises the step of:
selecting said amplitude change as a function of a communication attribute of a wireless unit communicating through said particular sector signal interface.

45. The method of claim 40, further comprising the step of:
   delaying a signal associated with a particular sector signal interface.

46. The method of claim 40, further comprising the step of:
   filtering signals communicated between each sector signal interface and said coupled antenna beam interfaces to substantially isolate signals of a service associated with said sector signal interface.

47. The method of claim 40, further comprising the step of:
   transmitting a signal from each of said sector signal interfaces, wherein radiation of each said transmitted signal is substantially isolated to an area defined by said selected ones of said antenna beam interfaces coupled to said sector signal interface.

48. The method of claim 40, further comprising the step of:
   receiving a signal at each of said sector signal interfaces, wherein origination of each said received signal is substantially isolated to an area defined by said selected ones of said antenna beam interfaces coupled to said sector signal interface.

49. A system for independently synthesizing multiple beam sectors for a plurality of communication systems operating on a same multibeam antenna providing a plurality of substantially non-overlapping antenna beams, said system comprising:
   a first plurality of switch matrixes associated with a first one of said communication systems, each switch matrix of said plurality adapted to selectably communicate a sector output signal of a transmitter of said first communication system to any antenna beam of said plurality of antenna beams;
   a second plurality of switch matrixes associated with a second one of said communication systems, each switch matrix of said plurality adapted to selectably communicate a sector output signal of a transmitter of said second communication system to any antenna beam of said plurality of antenna beams;
   a processor based system coupled to each switch matrix of said first plurality of switch matrixes and executing instructions to cause said first plurality of switch matrixes to provide communication between ones of said sector output signals of said first communication system and select antenna beams of said plurality of antenna beams, wherein said synthesized multiple beam sectors of said first communication system are a function of said ones of said antenna beams communicating with each sector signal interface of said first communication system; and
   a processor based system coupled to each switch matrix of said second plurality of switch matrixes and executing instructions to cause said second plurality of switch matrixes to provide communication between ones of said sector output signals of said second communication system and select antenna beams of said plurality of antenna beams, wherein said synthesized multiple beam sectors of said second communication system are a function of said ones of said antenna beams communicating with each sector signal interface of said second communication system, wherein an orientation and sector width of said synthesized multiple beam sectors of said first communication system are independent of an orientation and sector width of said synthesized multiple beam sectors of said second communication system.

50. The system of claim 49, further comprising:
   a third plurality of switch matrixes associated with a third one of said communication systems, each switch matrix of said plurality adapted to selectably communicate a sector output signal of a transmitter of said third communication system to any antenna beam of said plurality of antenna beams; and
   a processor based system coupled to each switch matrix of said third plurality of switch matrixes and executing instructions to cause said third plurality of switch matrixes to provide communication between ones of said sector output signals of said third communication system and select antenna beams of said plurality of antenna beams, wherein said synthesized sectors of said third communication system are a function of said ones of said antenna beams communicating with each sector signal interface of said third communication system.

51. The system of claim 49, wherein said processor based system coupled to said first plurality of switch matrixes and said processor based system coupled to said second plurality of switch matrixes are a same processor based system.

52. The system of claim 49, further comprising:
   variable phase shifters disposed in a signal path between each said sector output signal of said first communication system and each antenna beam of said plurality of antenna beams, said variable phase shifters being selectably adjusted to mitigate destructive combining of signals.

53. The system of claim 52, wherein said variable phase shifters are coupled to said processor based system coupled to said first plurality of switch matrixes, said coupled processor based system executing instructions to adjust said variable phase shifters to mitigate destructive combining of signals.

54. The system of claim 49, further comprising:
   variable attenuators disposed in a signal path between each said sector output signal of said first communication system and each antenna beam of said plurality of antenna beams, said variable attenuators being selectably adjusted to mitigate destructive combining of signals.

55. The system of claim 54, wherein said variable attenuators are coupled to said processor based system coupled to said first plurality of switch matrixes, said coupled processor based system executing instructions to adjust said variable attenuators to mitigate destructive combining of signals.

56. The system of claim 49, further comprising a combiner providing a connection between at least one antenna beam of said plurality of antenna beams and a switch matrix of said first plurality of switch matrixes and a switch matrix of said second plurality of switch matrixes.

57. A system for independently synthesizing multiple beam sectors for a first communication system and a second communication system operating on a same multibeam antenna providing a plurality of substantially non-overlapping antenna beams, said system comprising:
   a first plurality of switch matrixes associated with said first communication system, each switch matrix of said plurality adapted to selectably communicate signals associated with any antenna beam of said plurality of antenna beams to a sector input signal of a receiver of said first communication system;
   a second plurality of switch matrixes associated with said second communication system, each switch matrix of said plurality adapted to selectably communicate signals associated with any antenna beam of said plurality of antenna beams to a sector input signal of a receiver of said second communication system;

a processor based system coupled to each switch matrix of said first plurality of switch matrixes, said processor based system executing instructions to cause said first plurality of switch matrixes to provide communication between select antenna beams of said plurality of antenna beams and ones of said sector input signals of said first communication system, wherein said synthesized multiple beam sectors of said first communication system are a function of said ones of said antenna beams communicating with each sector signal interface of said first communication system; and a processor based system coupled to each switch matrix of said second plurality of switch matrixes, said processor based system executing instructions to cause said second plurality of switch matrixes to provide communication between select antenna beams of said plurality of antenna beams and ones of said sector output signals of said second communication system, wherein said synthesized multiple beam sectors of said second communication system are a function of said ones of said antenna beams communicating with each sector signal interface of said second communication, system wherein an orientation and sector width of said synthesized multiple beam sectors of said first communication system are independent of an orientation and sector width of said synthesized multiple beam sectors of said second communication system.

58. The system of claim 57, wherein said processor based system coupled to said first plurality of switch matrixes and said processor based system coupled to said second plurality of switch matrixes are a same processor based system.

59. The system of claim 57, further comprising:

filters disposed in a signal path between each said sector input signal of said first communication system and each antenna beam of said plurality of antenna beams, said filters preventing communication of substantially all signals except those associated with said first communication system.

60. The system of claim 57, further comprising a splitter providing a connection between at least one antenna beam of said plurality of antenna beams and a switch matrix of said first plurality of switch matrixes and a switch matrix of said second plurality of switch matrixes.

* * * * *